United States Patent
Bryan, III

(10) Patent No.: US 7,055,282 B2
(45) Date of Patent: Jun. 6, 2006

(54) HYDROPONIC PLANT CULTIVATING APPARATUS

(75) Inventor: Morris Bryan, III, Anderson, SC (US)

(73) Assignee: MB3, L.L.C., Anderson, SC (US)

( * ) Notice: Subject to any disclaimer, the term of this patent is extended or adjusted under 35 U.S.C. 154(b) by 162 days.

(21) Appl. No.: 10/915,967

(22) Filed: Aug. 11, 2004

(65) Prior Publication Data
US 2006/0032128 A1  Feb. 16, 2006

(51) Int. Cl.
*A01G 31/00* (2006.01)
(52) U.S. Cl. ...................................... 47/62 R
(58) Field of Classification Search .............. 47/82, 47/59 R
See application file for complete search history.

(56) References Cited

U.S. PATENT DOCUMENTS

| | | | | |
|---|---|---|---|---|
| 875,235 | A | * | 12/1907 | Bastel ............................ 47/82 |
| 4,006,559 | A | * | 2/1977 | Carlyon, Jr. .................... 47/39 |
| 4,033,072 | A | * | 7/1977 | Kobayashi et al. ......... 47/62 R |
| D247,165 | S | | 2/1978 | Hart |
| 4,218,847 | A | | 8/1980 | Leroux |
| D262,274 | S | | 12/1981 | Lahr |
| D278,614 | S | | 4/1985 | Moss |
| 4,756,120 | A | * | 7/1988 | Arledge ...................... 47/59 R |
| 4,918,861 | A | | 4/1990 | Carpenter |
| 4,986,027 | A | | 1/1991 | Harvey |
| 5,276,997 | A | * | 1/1994 | Swearengin et al. ........... 47/82 |
| 5,363,594 | A | | 11/1994 | Davis |
| 5,438,797 | A | * | 8/1995 | Lendel ......................... 47/82 |
| 5,440,836 | A | | 8/1995 | Lee |
| 5,555,676 | A | | 9/1996 | Lund |
| 6,408,570 | B1 | | 6/2002 | Shih |
| 6,477,805 | B1 | * | 11/2002 | Ware ............................. 47/83 |

FOREIGN PATENT DOCUMENTS

| | | |
|---|---|---|
| EP | 0 301 362 A1 | 1/1989 |
| GB | 2147484 A * | 5/1985 |

* cited by examiner

Primary Examiner—Francis T. Palo
(74) Attorney, Agent, or Firm—McNair Law Firm, P.A.

(57) ABSTRACT

A hydroponic system with modules having a hollow interior, a bottom wall with drain holes, and an open top end. A module conduit in each module carried by the bottom wall for channeling fluid through the hollow interior. The bottom wall of each module adapted to engage a top end of an adjacent module for stacking the modules in an end-to-end arrangement to form a planting column. A conduit receiving slot formed in the bottom wall of each module to engage a top portion of a conduit from an adjacent lower module when the modules are stacked end-to-end to provide a continuous fluid passageway through the planting column. A platform vertically carrying the planting column atop a fluid reservoir. A supply line connecting the reservoir to the fluid passageway. A fluid distributor atop the column in fluid communication with the fluid passageway for distributing fluid into the planting column.

28 Claims, 8 Drawing Sheets

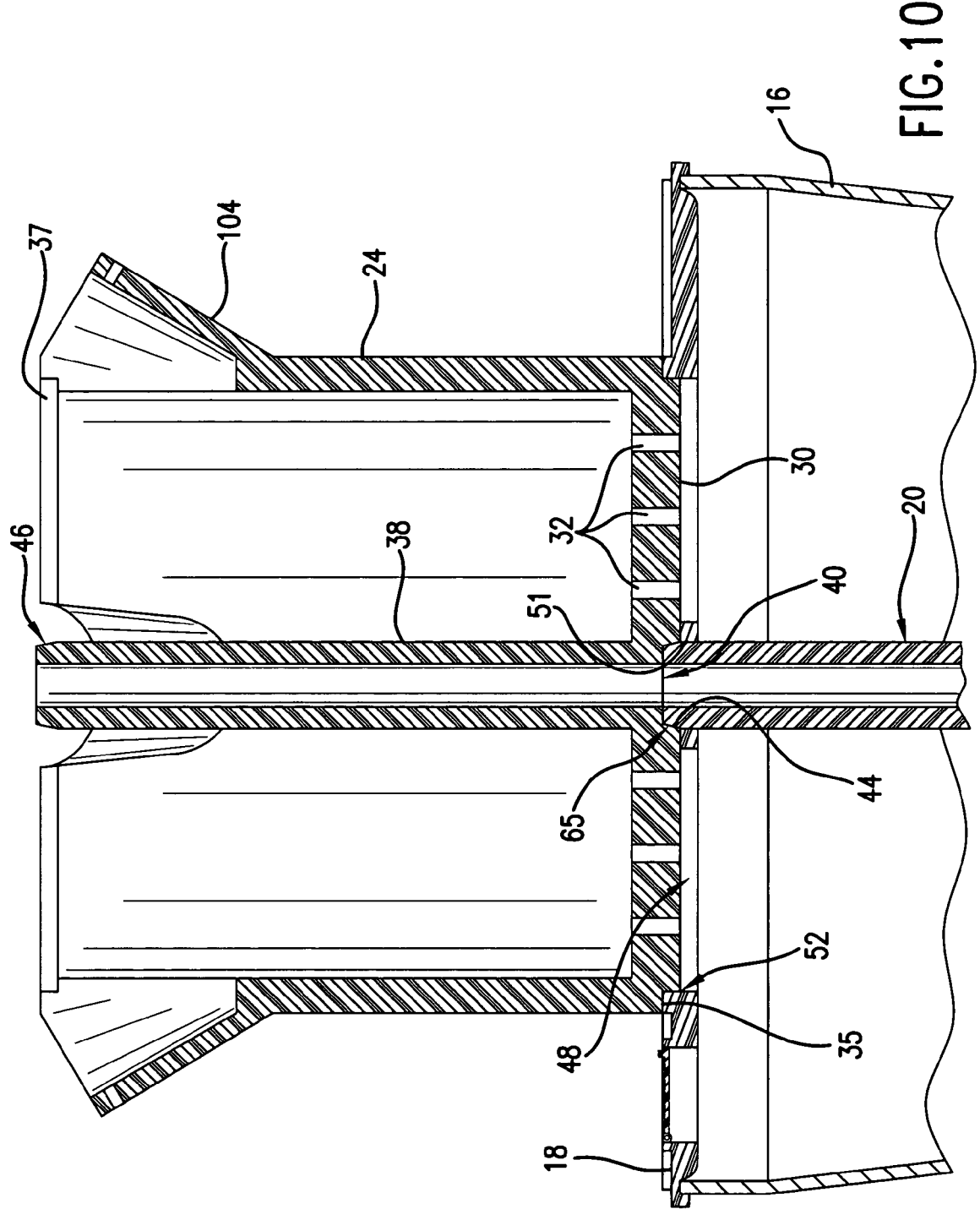

US 7,055,282 B2

HYDROPONIC PLANT CULTIVATING APPARATUS

BACKGROUND OF THE INVENTION

1) Field of the Invention

The present invention relates to hydroponic devices for plant cultivation, and more specifically, to a hydroponic plant cultivating apparatus having a rotatable modular planting column wherein each module includes an integrated fluid conduit, and the column is mounted in a vertical orientation to circulate a nutrient rich fluid for growing plants in a soil-less growth medium.

2) Description of Related Art

The prior art is replete with various types of hydroponic devices. Conventional vertical hydroponic systems generally include a lower reservoir for holding nutrient rich fluid to be feed to plants, a planting column for holding the plants, and a watering system running through the column which pumps the fluid upward to the top of the column where it is directed back down to the column interior for watering the plants. The fluid is typically recycled continuously or according to a timing mechanism that controls the pumping action.

U.S. Pat. No. 4,986,027 is an example of such a conventional vertical hydroponic system. It discloses a flexible tubular element of a woven material constructed in a vertical arrangement for holding plants. The tube includes a pair of perforated plates at the top and bottom of the tube for holding a growth medium in the tube while allowing water to pass through the plates. A series of planting holes are formed in the tube for receiving the plant roots. A pump assembly directs water from a fluid reservoir at the bottom upward through a continuous conduit inserted down the middle of the tube. Water trickles over the upper perforated plate and down into the tube. While inexpensive and easy to make, the tube of woven material cannot maintain the internal temperature of the growth medium, and the entire apparatus must be hung to prevent the tube from collapsing.

U.S. Pat. No. 5,555,676 is another example that discloses a vertical planter apparatus having a hollow modular column mounted vertically on a fluid reservoir. The column is produced by stacking column modules together and filling the hollow interior with a planting medium. A plurality of planting ports are formed in the wall of the column, along with a plurality of aeration ports. A water distribution system is provided for delivering fluid to the planting medium and includes an upper reservoir mounted atop a central conduit that runs down through the entire length of each column module to a pump in the lower reservoir. The water is directed through offshoots of the conduit into the growth medium of the column. In this case, there is no ability to rotate the column on top of the lower reservoir without disturbing the growth medium and watering system, which might damage the system or the plants. Additionally, there is no ability to remove the modular column sections once planted without completely disassembling the apparatus and replanting everything.

U.S. Pat. No. 5,363,594 discloses another example of a vertical gardening system that includes a vertical column filled with a growth medium mounted atop a fluid reservoir. The column includes a plurality of planting and aeration holes. An irrigation conduit runs upward through the column and includes a nozzle disposed at the top of the conduit for dispensing water into the growth medium. Again, there is no ability to rotate the column on top of the lower reservoir, and no ability to remove sections of the planting column once planted.

Accordingly, it is an object of the present invention to provide a hydroponic plant cultivating apparatus with a modular vertical planting column in which a section of the column can be exchanged without disturbing the remainder of the column or components of the watering system.

It is a further object of the present invention to provide a hydroponic plant cultivating apparatus in which the planting column may be easily rotated.

It is a further object of the present invention to provide a hydroponic plant cultivating apparatus which is inexpensive to manufacture, easy to assemble and simple to use.

It is a further object of the present invention to provide a hydroponic plant cultivating apparatus that is self-contained and capable of extended unattended operation.

SUMMARY OF THE INVENTION

The above objectives are accomplished according to the present invention by providing a novel hydroponic plant cultivating apparatus preferably constructed and arranged as detailed herein below. In a preferred embodiment, the apparatus includes a planting column having a hollow interior for receiving a planting medium. Planting ports are included in the column for receiving plants at least partially into the hollow interior for engaging the planting medium. Advantageously, a conduit is integrally formed within and carried by the planting column, which extends axially through the hollow interior and the planting medium for channeling fluid from a bottom portion to a top portion of the column. A reservoir is provided for holding fluid. A platform is carried by the reservoir that engages the bottom portion of the planting column to mount the planting column in a generally vertical orientation atop the reservoir in fluid communication. A supply line connects the reservoir in fluid communication to the conduit for directing fluid from the reservoir upward through the conduit. A fluid distributor is mounted atop the planting column in fluid communication with the conduit for distributing the fluid into the hollow interior. Accordingly, fluid may be circulated through the planting column to provide nutrients to the planting medium for growing plants inserted into the planting ports of the column.

In a preferred embodiment, the planting column comprises at least a pair of modules each having a hollow module interior, a bottom wall including a plurality of drain holes forming a generally enclosed bottom end, and an open top end. The bottom wall of each module being adapted to engage a top end of an adjacent module for stacking the modules in an end-to-end arrangement to form the planting column. Each of the modules includes a module conduit carried by the bottom wall forming an opening in the bottom wall and extending from the bottom wall upward through the hollow module interior to the open top end for channeling fluid through the hollow module interior. Further, a conduit receiving slot is formed in the bottom wall of each module adjacent the opening in the bottom wall. The conduit receiving slot is adapted to engage a top portion of a module conduit from an adjacent lower module in the planting column when stacked end-to-end to form the conduit and provide a continuous fluid passageway through the entire planting column.

In a particularly preferred embodiment, the drain holes in the bottom wall are approximately ¼" in diameter and arranged in radially extending lines from the center of the bottom wall with at least three drain holes being laterally spaced per line and each line being separated by approximately 45° to provide at least 24 drain holes.

Preferably, the planting column is constructed of high impact polystyrene to provide insulated walls for promoting a consistent temperature within the column.

A fluid return opening is provided in the platform beneath the planting column for allowing the fluid to drain from the bottom portion of the planting column though the platform and into the reservoir. In a preferred embodiment, a plurality of reinforcing ribs are provided that extend radially across the platform and through the fluid return opening to support the planting column.

In a particularly advantageous embodiment, the planting column is rotatably carried by the platform atop the reservoir. To accommodate the rotatable platform and planting column, the apparatus includes a swivel coupling included along the supply line for allowing rotation of the planting column without causing rotation of the supply line between the swivel coupling an the reservoir.

A control valve is included in the apparatus that is operatively associated with the supply line and the conduit for selectively controlling the amount of fluid flow from the reservoir upward through the conduit.

Preferably, a drain line is provided in fluid communication with the supply line for selectively draining fluid from the reservoir.

For extended unattended operation, a float valve is preferably carried in the reservoir for monitoring a fluid level in the reservoir. A secondary fluid supply is further operatively associated with the float valve for introducing additional fluid into the reservoir when the float valve is opened as a result of a low fluid level in the reservoir. Once the fluid level is returned to an appropriate level, the float valve closes to stop the introduction of fluid from the secondary fluid supply.

In a preferred embodiment, the fluid distributor is constructed and arranged to provide a distribution reservoir with a plurality of drain holes formed in a bottom wall of the distributor. The drain holes are adapted for distributing the fluid into the hollow interior of the planting column while maintaining a fluid level in the distribution reservoir to provide a consistent continuous flow of fluid into the planting column that is evenly distributed. In a particular embodiment, the drain holes in the bottom wall of the fluid distributor are approximately ⅛" in diameter and arranged in radially extending lines from the center of the bottom wall with at least three drain holes being laterally spaced per line and each line being separated by approximately 45° to provide at least 24 drain holes.

Advantageously, a distributor conduit is carried by the bottom wall of the fluid distributor forming an opening in the bottom wall and extending from the bottom wall upward into the distribution reservoir. A conduit receiving slot is formed in the bottom wall of the fluid distributor adjacent the opening in the bottom wall. The conduit receiving slot is adapted to engage a top portion of the conduit in the planting column when stacked end-to-end to provide a continuous fluid passageway from the conduit into the fluid distributor.

In a preferred embodiment, an inclined support cup is provided adjacent the planting port and integrally formed with and protruding from the planting column to support a plant in a generally upright orientation as the plant grows outward from the planting column.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
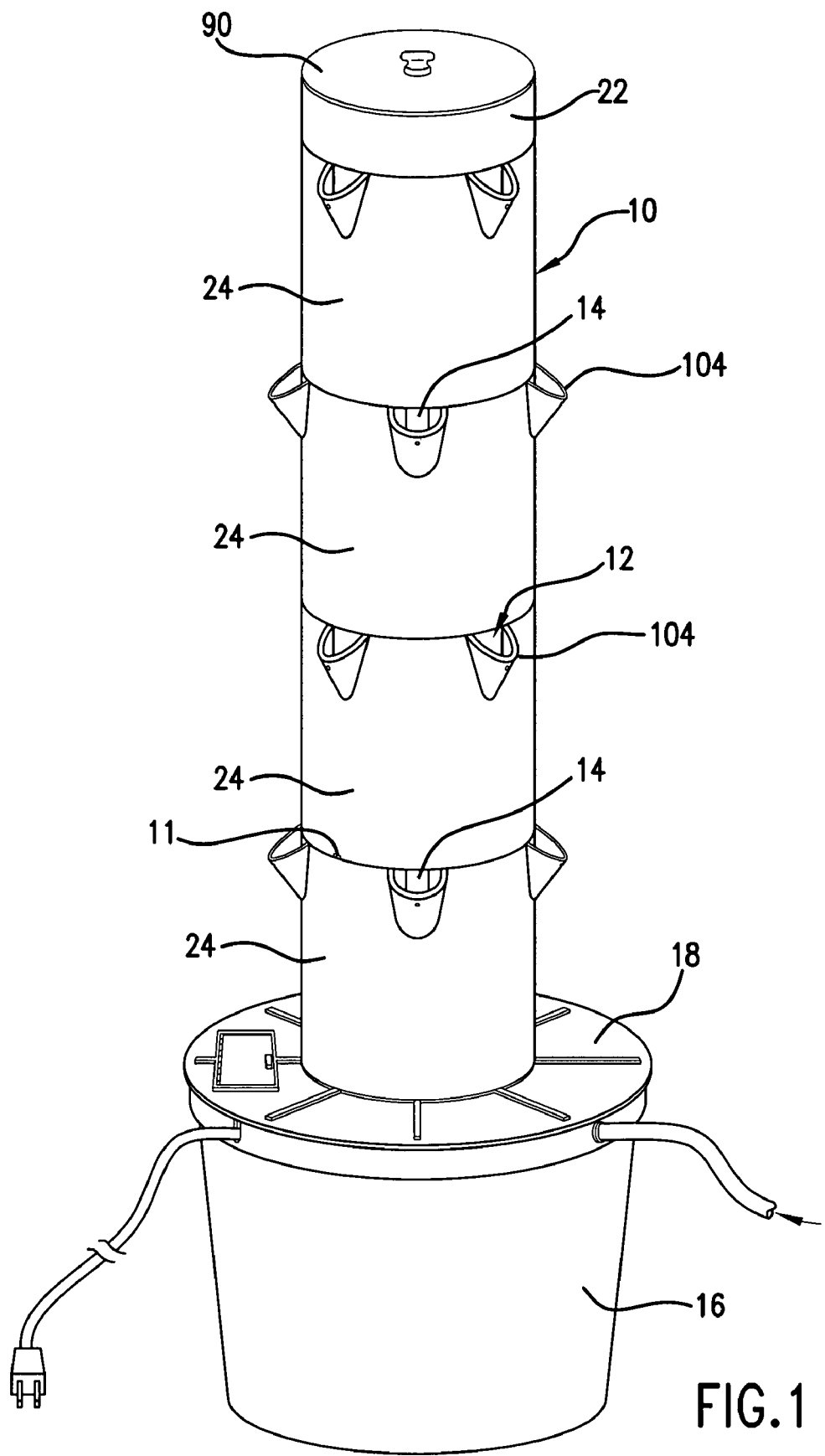
FIG. 1 shows a perspective view of the hydroponic plant cultivating apparatus according to the present invention.

With reference to the drawings, the invention will now be described in more detail. Referring to FIG. 1, a hydroponic plant cultivating apparatus is shown. The apparatus includes a planting column, designated generally as 10, constructed and arranged with a hollow interior for receiving a planting medium. Planting ports, designated generally as 12, are located around column 10 for allowing plant roots to be inserted into the planting medium of column 10. A central conduit 14 is integrally formed within and carried by planting column 10, which extends axially through the hollow interior and the planting medium for channeling fluid from a bottom portion to a top portion of column 10. Conduit 14 need not be centrally positioned within plating column 10. A reservoir 16 is provided for holding water or another nutrient rich fluid for feeding to the plants. A platform 18 is carried by reservoir 16 that engages the bottom portion of planting column 10 to mount the planting column in a generally vertical orientation atop reservoir 16. As explained further below, planting column 10 is in fluid communication with reservoir 16 for circulating fluid. A supply line, designated generally as 20 and best shown in FIG. 9, connects reservoir 16 in fluid communication to conduit 14 for directing fluid from reservoir 16 upward through conduit 14, as best shown in FIG. 10. A fluid distributor 22 is mounted atop planting column 10 in fluid communication with conduit 14 for distributing the fluid into the hollow interior of planting column 10. Accordingly, fluid may be circulated through the planting column to provide nutrients to the planting medium for growing plants inserted into the planting ports of the column.

Figure 2:
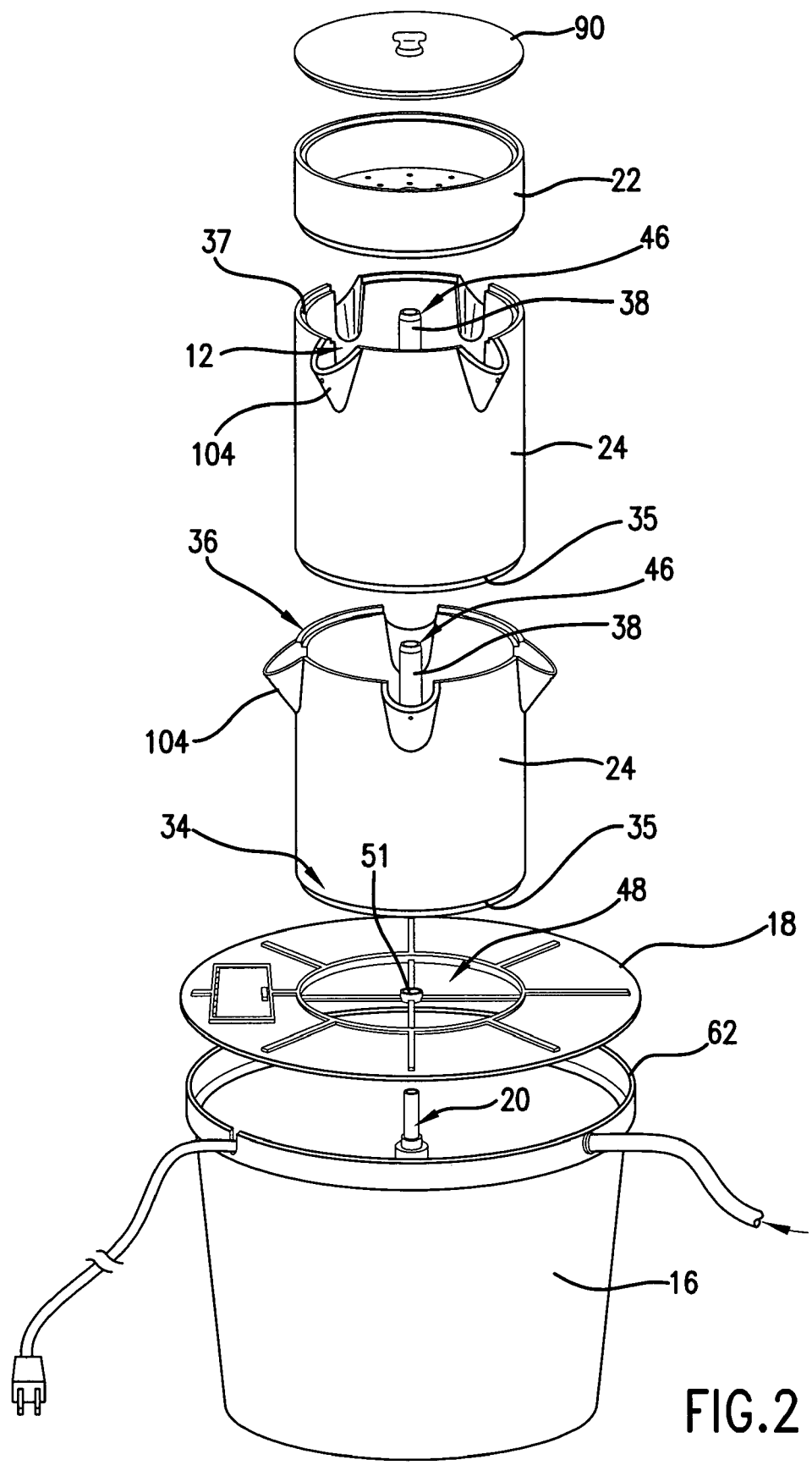
FIG. 2 shows an exploded view of the apparatus depicted in FIG. 1.
Figure 3:
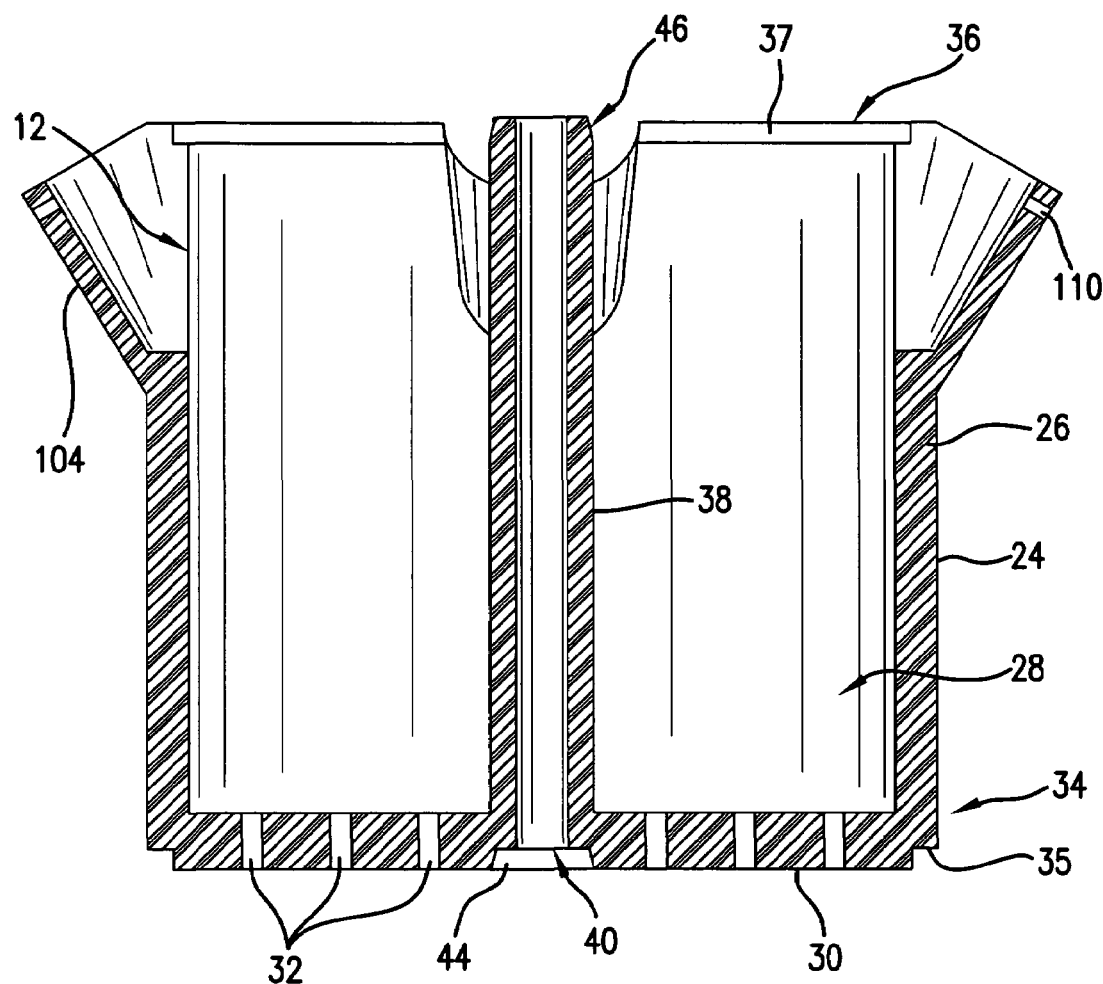
FIG. 3 shows a cross-section view of a module according to the present invention.
Figure 5:
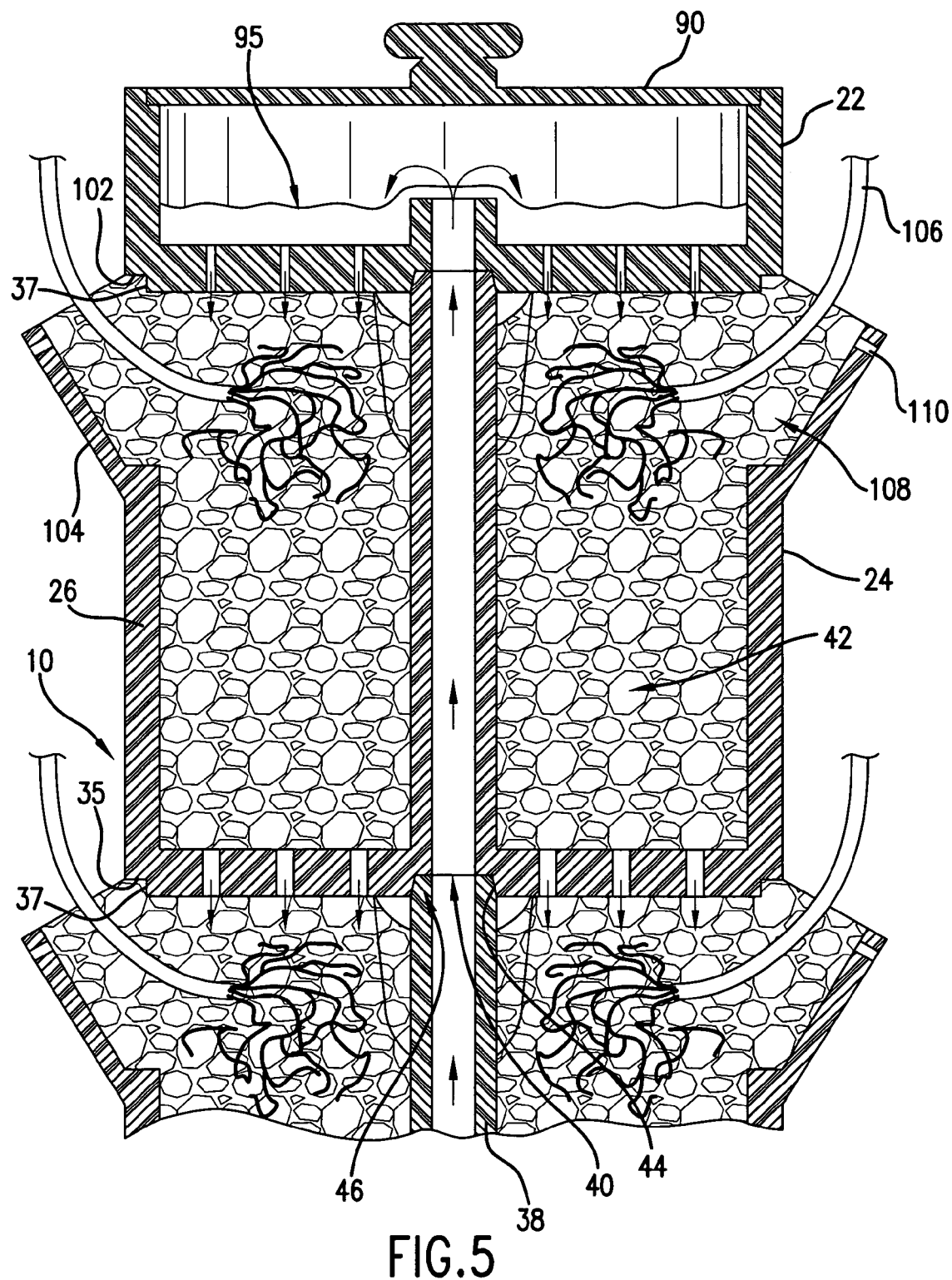
FIG. 5 shows a cross-section view of a top portion of the planting column according to the present invention.

Referring to FIGS. 2 and 3, in a preferred embodiment, planting column 10 is formed from a plurality of modules 24. Each of modules 24 have insulated sidewalls 26 forming a hollow module interior, designated generally as 28. A bottom wall 30 is included in each module that has a plurality of drain holes 32 forming a partially enclosed bottom end, designated generally as 34. Each module also includes an open top end, designated generally as 36. Bottom wall 30 of modules 24 is contoured to include a circumferential groove 35 adapted to engage a complementary groove 37 formed in top end 36 of each module to allow adjacent modules to stacking in an end-to-end arrangement to form planting column 10, as best shown in FIGS. 1 and 5. Bottom wall 30 prevents planting medium from falling out of each module while allowing fluid to pass through each module and back into reservoir 16. The fit between modules 24 should be a tight friction fit arrangement. In a preferred embodiment, in order to separate modules 24, a notch 11 is disposed just above circumferential groove 35, as shown in FIG. 1. The notch is adapted to receive the end of a screwdriver or other such tool that can be used to pry the modules apart.

Each of modules 24 also includes a module conduit 38 integrally carried by bottom wall 30, which forms an opening, designated generally as 40, through bottom wall 30. Module conduit 38 extends from bottom wall 30 upward through hollow module interior 28 to open top end 36 for channeling fluid through hollow module interior 28, which is typically packed with planting medium, designated generally as 42, as best shown in FIG. 5. Planting medium 42, for example, may be rock wool, or other commonly known medium used by those skilled in the art. Further, planting medium 42 may simply be air within the hollow interior of each module 24.

Referring to FIGS. 3 and 5, a conduit receiving slot 44 is formed in bottom wall 30 of each module 24 adjacent opening 40 in bottom wall 30 formed by conduit 38. Conduit receiving slot 44 is adapted to engage a complementary top portion, designated generally as 46, of module conduit 38 from an adjacent lower module in planting column 10 when stacked end-to-end to form continuous central conduit 14 which provides a continuous fluid passageway through the entire planting column, regardless of the number of modules stacked together. By making planting column 10 modular with central conduit 14 formed by smaller module conduits 38, modules 24 can be exchanged at any time without having to worry about reinstalling a single elongated piece of conduit though all the planting medium in the planting column. Accordingly, this allows for crop staging and the removal of modules carrying diseased plants without having to replant the entire planting column.

Figure 8:
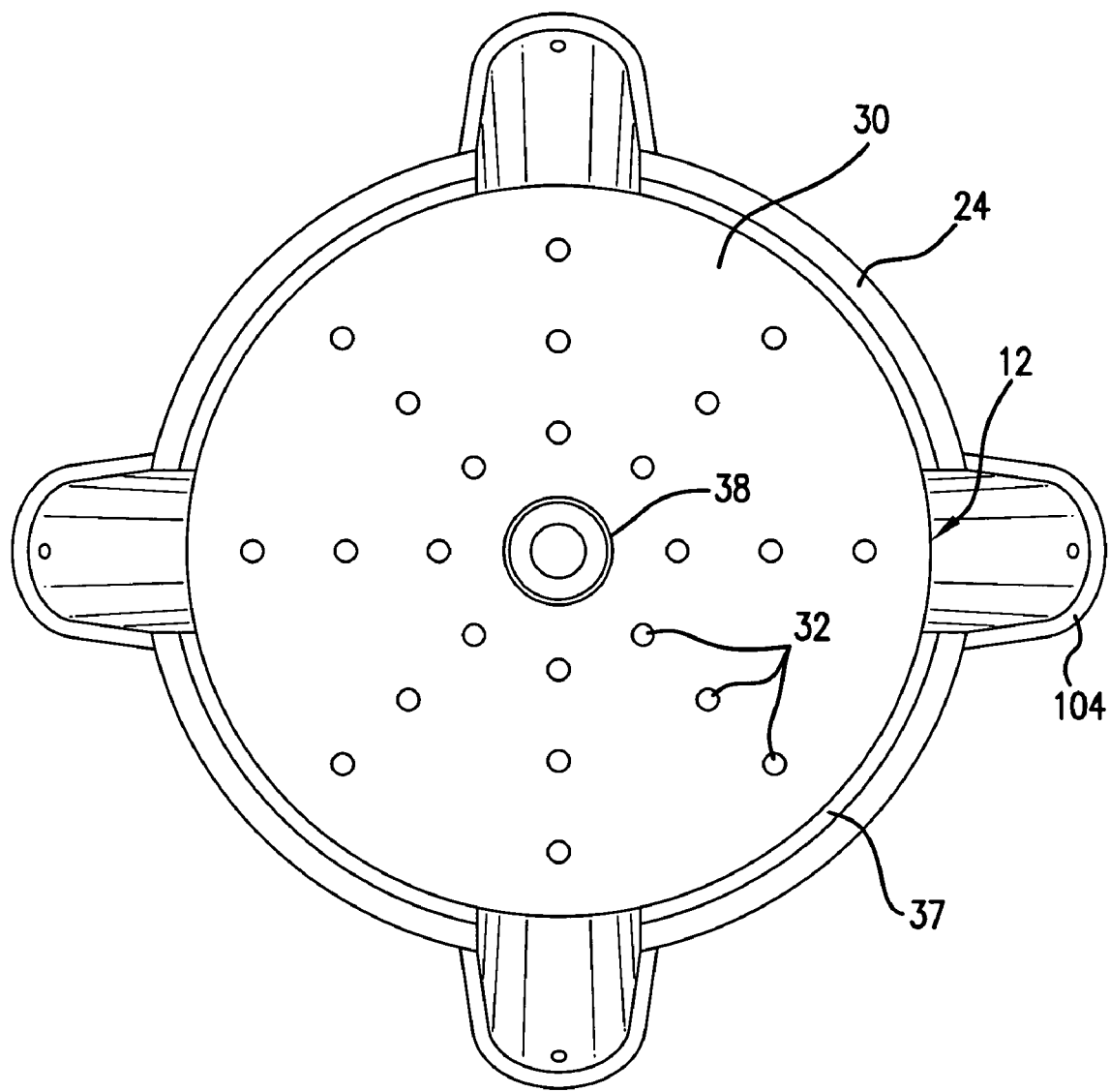
FIG. 8 shows a top view of the module according to the present invention.

Referring to FIG. 8, in a particularly preferred embodiment, drain holes 32 in bottom wall 30 are approximately ¼" in diameter and arranged in radially extending lines from the center of bottom wall 30 with at least three drain holes being laterally spaced per line and each line being separated by approximately 45° to provide at least 24 drain holes.

Preferably, planting column 10 is constructed of high impact polystyrene to provide insulated walls for promoting a consistent temperature within the column. Polystyrene is a particularly effective insulator due to air gaps created in the material that act as a buffer. Additionally, these air gaps make polystyrene very light, regardless of whether it is a hardened or softer version of polystyrene.

Figure 6:
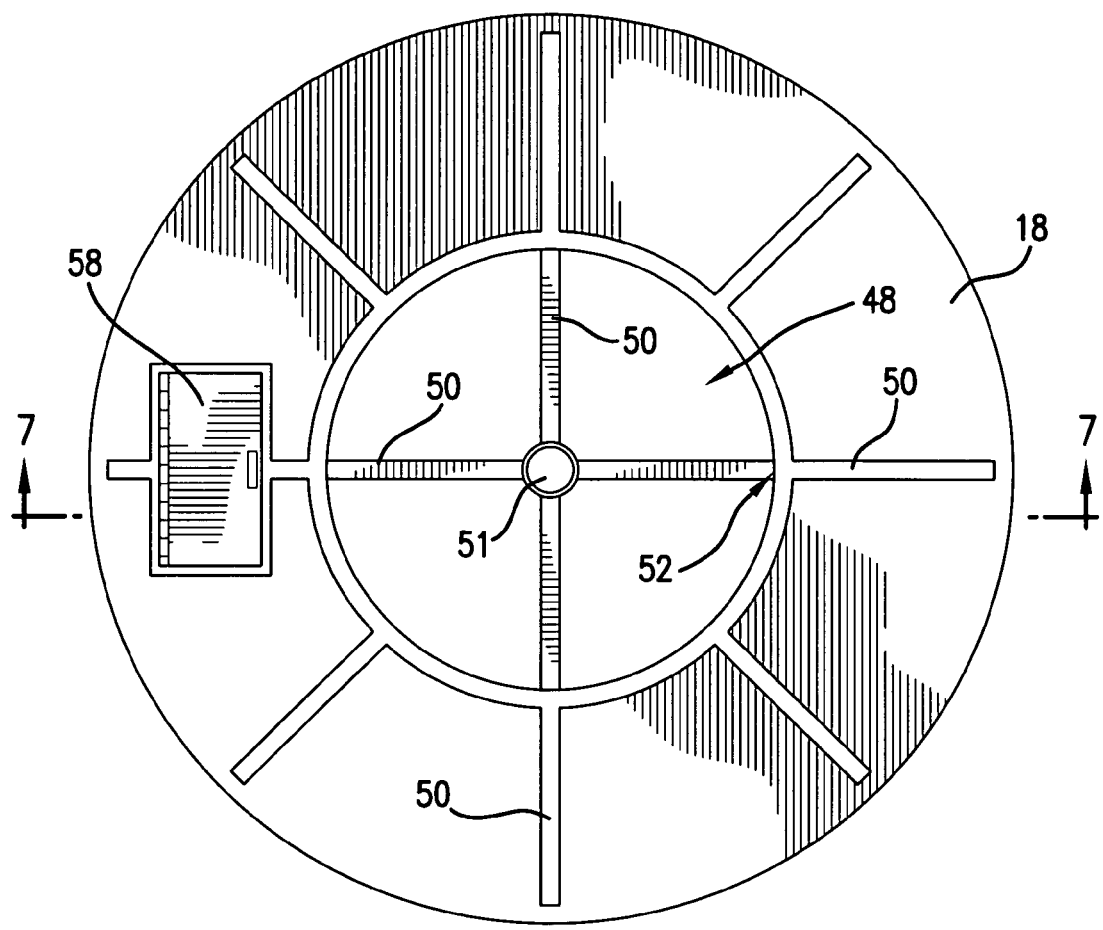
FIG. 6 shows a top view of the platform according to the present invention.
Figure 7:
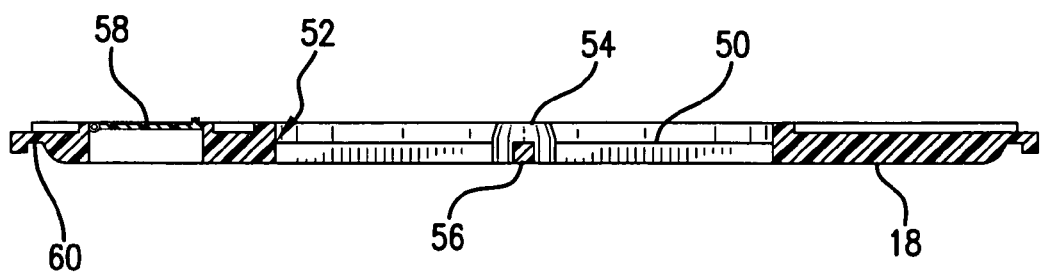
FIG. 7 shows a cross-section view of the platform according to the present invention.

Referring to FIGS. 2, 6 and 7, a fluid return opening, designated generally as 48, is provided in platform 18, which is located beneath planting column 10 when the column is mounted to platform 18. Fluid return opening 48 allows the fluid in the column to drain from drain holes 32 of module 24 at the bottom portion of planting column 10 though platform 18 and into reservoir 16, where the fluid can be recirculated. As best shown in FIG. 6, a plurality of reinforcing ribs 50 are provided that extend radially across the platform and through fluid return opening 48 to support planting column 10. As shown in FIG. 2, the module forming the bottom portion of column 10 includes circumferential groove 35. Referring to FIG. 7, circumferential groove 35 is received in complementary platform recess, designated generally as 52, in an arrangement similar to that for the engagement between modules 24. This firmly holds the column in place to prevent accidental tipping.

Figure 9:
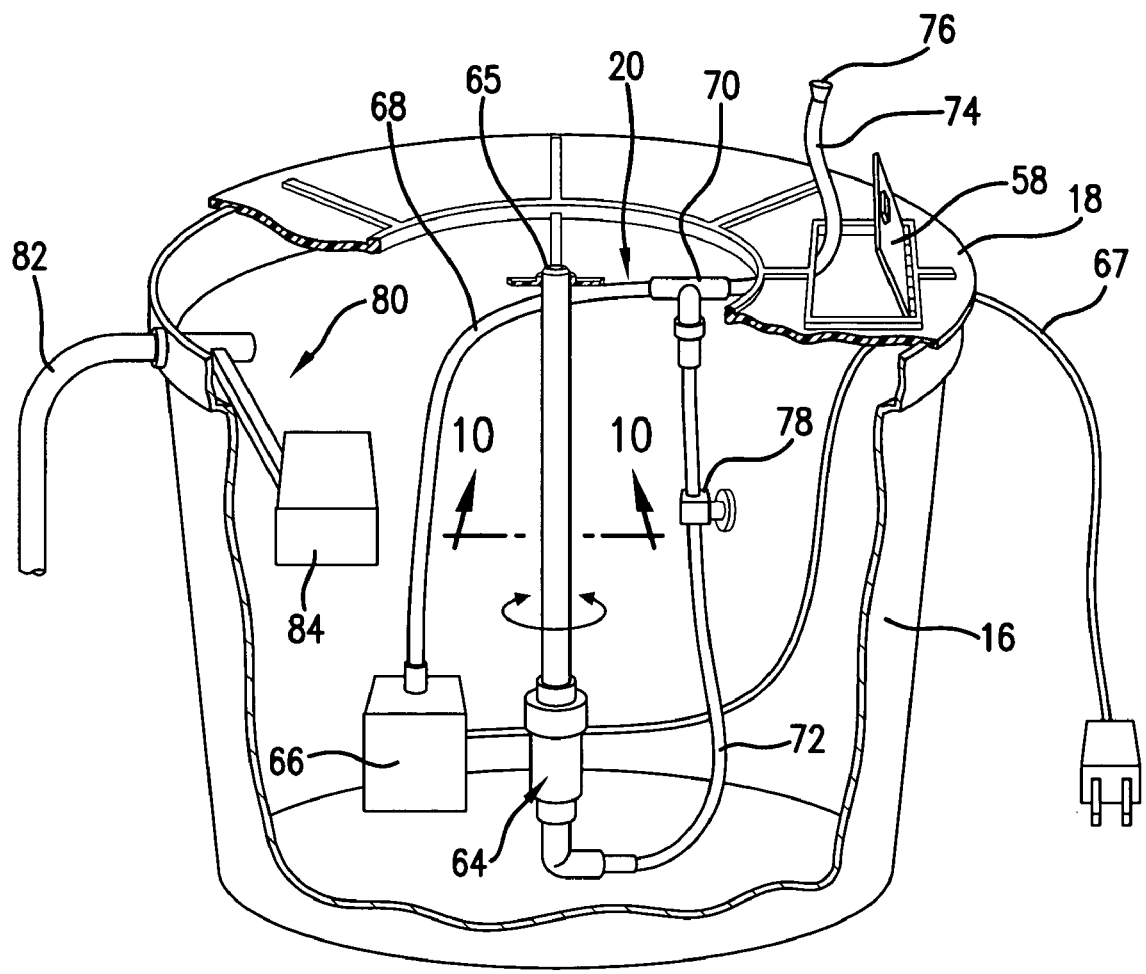
FIG. 9 shows a cut-away side view of the reservoir according to the present invention; and, FIG. 10 shows a cross-section view of a bottom portion of the planting column mounted atop the reservoir according to the present invention.

Referring to FIGS. 2 and 6, supply line 20 is directed upward through a central opening 51 in platform 18 to engaged central conduit 14 formed by modules 24 to direct the fluid from reservoir 16, through supply line 20, and into the module conduits 38 to fluid distributor 22. Referring to FIGS. 9 and 10, in a preferred embodiment, distal end 65 of supply line 20 is formed to conform to the shape of top portion 46 of module conduit 38, which is accordingly adapted to engaged conduit receiving slot 44 of module 24 at the bottom of planting column 10 in the same manner as top portion 46 of module conduit 38 engages slot 44 when the modules are stacked end-to-end.

Referring to FIG. 7, an alternative embodiment of platform 18 is shown which includes a module conduit engaging portion 54 that is adapted to engage conduit receiving slot 44 in bottom wall 30 of module 24. Module conduit engaging portion 54 includes a fluid passageway 56 for provide a continuous fluid passageway between platform 18 and conduit 14 formed by the individual module conduits 38. Distal end 65 of supply line 20 is adapted to engage fluid passageway 56 to direct fluid upward into conduit 14.

Additionally, an access panel 58 is provided in platform 18 for allowing access to the supply lines and pumping mechanism contained in reservoir 16 when platform 18 and planting column 10 are mounted atop reservoir 16.

Referring to FIGS. 2 and 7, platform 18 includes a recess 60 for engaging a lip 62 of reservoir 16. This arrangement allows planting column 10 to be rotatably carried by platform 18 atop reservoir 16. Alternatively, it is also possible to rotated planting column 10 on platform 18 without having to rotate platform 18. Referring to FIG. 9, to accommodate the rotatable platform and planting column, the apparatus advantageously includes a swivel coupling, designated generally as 64, included along supply line 20 for allowing rotation of planting column 10 without causing rotation of the supply line between the swivel coupling and the reservoir. Swivel coupling 64 is well known to those skilled in the art and may be found at most local hardware stores.

As shown in FIG. 9, a pump 66 is provided in fluid communication with reservoir 16. A first supply line 68 extends from pump 66 to a splitter connector 70. From splitter connector 70, a second supply line 72 extends to connect with swivel connector 64 to direct water upward into conduit 14. A drain line 74 is provided which extends from splitter connector 70 to an exterior of reservoir 16 through platform 18 for selectively draining fluid from the reservoir. By placing a plug 76 in the end of drain line 74, fluid is directed through second supply line 72. By removing plug 76, the reservoir may be drained when control valve 78 is closed. Various alternative arrangement involving different types of valves and supply lines may be used to accomplish the task of diverting water to a supply line or to a drain line and the embodiment discussed above and illustrated in the figures is only one example, which is considered the best known cost effective method to accomplish this task.

Referring to FIG. 9, as noted above, a control valve 78 is included along supply line 20 that is operatively associated with the supply line and, accordingly, conduit 14 for selectively controlling the amount of fluid flow from the reservoir upward through the conduit. Control valve 78 is necessary to adjust the flow of fluid depending on the number of modules used to create the planting column. The more modules, the higher the fluid pressure needed to pump the fluid to fluid distributor 22. The control valve is adjusted to increase or decrease fluid flow to prevent an overflow of fluid in fluid distributor 22 when only a few modules are used, as well as to provide sufficient flow of fluid to fluid distributor 22 when, for example, six modules are stacked together. In the preferred embodiment, control valve 78 is adjusted so that a level of fluid is constantly maintained in fluid distributor 22 during a watering cycle, which provides for even distribution of fluid from drain holes in the fluid distributor into the hollow interior of the planting column. Ultimately, only the capacity of pump 66 determines how many modules can be stacked.

For extended unattended operation, a float valve, designated generally as 80, is carried in the reservoir for monitoring a fluid level in the reservoir. A secondary fluid supply 82, such as a watering hose, is further operatively associated with float valve 80 for introducing additional fluid into reservoir 16 when float valve 80 is opened as a result of a low fluid level in reservoir 16. Once the fluid level is returned to an appropriate level which raises float 84 of float valve 80, the float valve is closed to stop the introduction of fluid from secondary fluid supply 82. Additionally, in a preferred embodiment, power supply 67 of pump 66 is operatively associated with a timing mechanism for pumping fluid from reservoir 16 into fluid distributor 22 so that watering cycles can be accomplished automatically and the duration of the cycles adjusted accordingly. Such timing mechanisms are well known and commonly available at home improvement stores.

Figure 4:
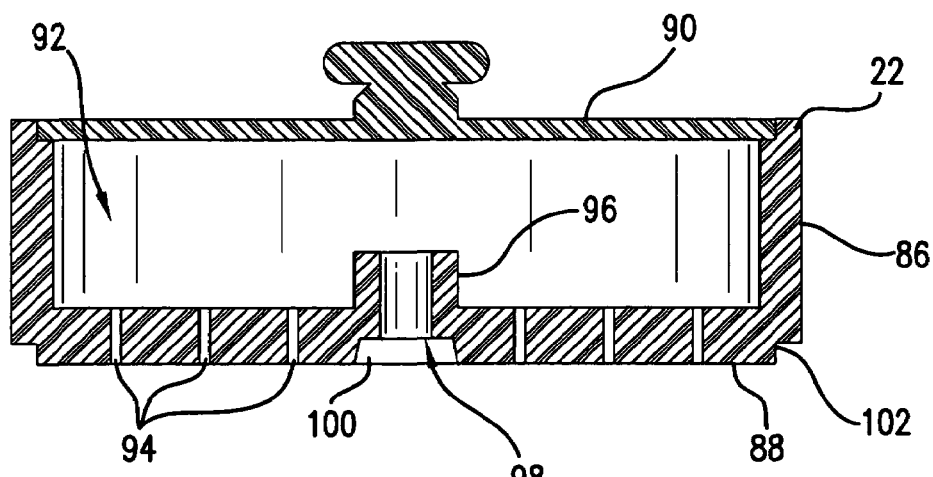
FIG. 4 shows a cross-section view of the fluid distributor according to the present invention.

Referring to FIG. 4, fluid distributor 22 is constructed and arranged to have a hollow interior formed by insulated side walls 86, a bottom wall 88, and a lid 90 covering the hollow interior. Lid 90 prevents rainwater and other elements from entering the planting column through fluid distributor 22. The hollow interior provides a distribution reservoir, designated generally as 92 for holding a supply of fluid received from conduit 14. A plurality of drain holes 94 are formed in bottom wall 88 of fluid distributor 22. Drain holes 94 are adapted for distributing the fluid into the hollow interior of the planting column 10 while maintaining a fluid level, designated generally as 95, in the distribution reservoir to provide a consistent continuous flow of fluid into the planting column that is evenly distributed during watering cycles.

In a preferred embodiment, drain holes 94 in bottom wall 88 of fluid distributor 22 are approximately 1/8" in diameter and arranged in radially extending lines from the center of bottom wall 88 with at least three drain holes being laterally spaced per line and each line being separated by approximately 45° to provide at least 24 drain holes. Note that the smaller size of drain hole, as opposed to the 1/4" size drain hole of the modules, allows for a restricted flow to help maintain a fluid level above the drain holes during watering. If the holes are to large, the fluid will drain to quickly through the first few holes in the line and fail to reach the periphery of distribution reservoir 92, which will result in inadequate fluid distribution through the hollow interior of planting column 10.

Advantageously, a distributor conduit 96 is carried by bottom wall 88 of fluid distributor 22 forming an opening, designated generally as 98, in bottom wall 88 and extending from the bottom wall upward into distribution reservoir 92. Unlike the module conduits, the distributor conduit extends only partially upward into distribution reservoir 92 to allow fluid channeled into distributor conduit 96 to overflow into distribution reservoir 92, where it then drains into planting column 10. As is identical to the module construction, a distributor conduit receiving slot 100 is formed in the bottom wall of fluid distributor 22 adjacent opening 98 in bottom wall 88. Distributor conduit receiving slot 100 is adapted to engage top portion 46 of conduit 38 of modules 24 when stacked end-to-end to provide planting column 10, which provides a continuous fluid passageway from conduit 14 into fluid distributor 22. Additionally, bottom wall 88 of fluid distributor 22 is contoured to include a circumferential groove 102 adapted to engage a complementary groove 37 formed in top end 36 of each module to allow fluid distributor 22 to stacking on top of the last module 24 of planting column 10, as best shown in FIGS. 1 and 5.

In a preferred embodiment, an inclined support cup 104 is provided adjacent planting port 12 and integrally formed with and protruding from planting column 10 to support a plant 106 in a generally upright orientation as the plant grows outward from the planting column. Preferably, support cup 104 is inclined at an angle of 30° to promote the upward growth and support of plants 106 inserted into planting ports 12. Additionally, referring to FIG. 3, a tie hole 110 is provided in support cup 104. Tie hole 110 is used for receiving and anchoring a string that may be used to help hold a plant inserted into a lower planting port in an upright orientation.

In a further advantageous embodiment, a hydrophobic planting medium, designated generally as 108, is inserted into inclined support cups 104 to fill support cup 104 so that rainwater which hits hydrophobic planting medium 108 runs off the planting medium and down the outside of the support cup away from planting column 10 to prevent rainwater from entering the apparatus.

While a preferred embodiment of the invention has been described using specific terms, such description is for illustrative purposes only, and it is to be understood that changes and variations may be made without departing from the spirit or scope of the following claims.

What is claimed is:

1. A hydroponic plant cultivating apparatus comprising:
 a planting column having a hollow interior for receiving a planting medium;
 at least one planting port included in said planting column for receiving plants at least partially into said hollow interior for engaging said planting medium;
 a conduit integrally formed within and carried by said planting column extending axially through said hollow interior and said planting medium for channeling fluid from a bottom portion to a top portion of said column;
 a reservoir for holding fluid;
 a platform carried by said reservoir engaging said bottom portion of said planting column to mount said planting column in a generally vertical orientation atop said reservoir in fluid communication;
 a supply line connecting said reservoir in fluid communication to said conduit for directing fluid from said reservoir upward through said conduit; and,
 a fluid distributor mounted atop said planting column in fluid communication with said conduit for distributing said fluid into said hollow interior;
 whereby fluid may be circulated through said planting column to provide nutrients to said planting medium for growing plants inserted into said planting ports of said column.

2. The apparatus of claim 1 wherein said planting column comprises at least a pair of modules each having a hollow module interior, a bottom wall including a plurality of drain holes forming a generally enclosed bottom end, and an open top end; said bottom wall of each module adapted to engage a top end of an adjacent module for stacking said modules in an end-to-end arrangement to form said planting column.

3. The apparatus of claim 2 wherein said drain holes in said bottom wall are approximately ¼" in diameter and arranged in radially extending lines from the center of said bottom wall with at least three drain holes being laterally spaced per line and each line being separated by approximately 45° to provide at least 24 drain holes.

4. The apparatus of claim 2 wherein each of said modules includes a module conduit carried by said bottom wall forming an opening in said bottom wall and extending from said bottom wall upward through said hollow module interior to said open top end for channeling fluid through said hollow module interior.

5. The apparatus of claim 4 including a conduit receiving slot formed in said bottom wall of each module adjacent said opening in said bottom wall; said conduit receiving slot adapted to engage a top portion of a module conduit from an adjacent lower module in said planting column when said modules are stacked end-to-end to form said conduit and provide a continuous fluid passageway through said planting column.

6. The apparatus of claim 1 wherein said planting column is constructed of high impact polystyrene to provide insulated walls for promoting a consistent temperature within said column.

7. The apparatus of claim 1 including a fluid return opening in said platform beneath said planting column for allowing said fluid to drain from said bottom portion of said planting column though said platform and into said reservoir.

8. The apparatus of claim 7 including a plurality of reinforcing ribs extending radially across said platform and through said fluid return opening to support said planting column.

9. The apparatus of claim 1 wherein said planting column is rotatably carried by said platform atop said reservoir.

10. The apparatus of claim 9 including a swivel coupling included along said supply line for allowing rotation of said planting column without causing rotation of said supply line between said swivel coupling and said reservoir.

11. The apparatus of claim 1 including a control valve operatively associated with said supply line and said conduit for selectively controlling the amount of fluid flow from said reservoir upward through said conduit.

12. The apparatus of claim 1 including a drain line in fluid communication with said supply line for selectively draining fluid from said reservoir.

13. The apparatus of claim 1 including a float valve carried in said reservoir for monitoring a fluid level in said reservoir; and a secondary fluid supply operatively associated with said float valve for introducing additional fluid into said reservoir when said float valve is opened as a result of a low fluid level in said reservoir.

14. The apparatus of claim 1 wherein said fluid distributor is constructed and arranged to provide a distribution reservoir with a plurality of drain holes formed in a bottom wall of said distributor; said drain holes adapted for distributing said fluid into said hollow interior of said planting column while maintaining a fluid level in said distribution reservoir to provide a consistent continuous flow of fluid into said planting column that is evenly distributed.

15. The apparatus of claim 14 wherein said drain holes in said bottom wall of said fluid distributor are approximately ⅛" in diameter and arranged in radially extending lines from the center of said bottom wall with at least three drain holes being laterally spaced per line and each line being separated by approximately 45° to provide at least 24 drain holes.

16. The apparatus of claim 14 including a distributor conduit carried by said bottom wall of said fluid distributor forming an opening in said bottom wall and extending from said bottom wall upward into said distribution reservoir; a conduit receiving slot formed in said bottom wall of said fluid distributor adjacent said opening in said bottom wall; said conduit receiving slot adapted to engage a top portion of said conduit in said planting column to provide a continuous fluid passageway from said conduit into said fluid distributor.

17. The apparatus of claim 1 including an inclined support cup adjacent said planting port integrally formed with and protruding from said planting column to support a plant in a generally upright orientation as the plant grows outward from said planting column.

18. A hydroponic plant cultivating apparatus comprising:
a planting column having a hollow interior for receiving a planting medium;
a reservoir for holding fluid;
a platform rotatably mounting said planting column in a generally vertical orientation atop said reservoir in fluid communication;
a conduit carried by said planting column extending axially through said hollow interior for channeling fluid from a bottom portion to a top portion of said column;
a fluid distributor carried at a top end of said column in fluid communication with said conduit for directing said fluid into said hollow interior;
a pump in fluid communication with said reservoir;
a supply line connecting said pump and said conduit in fluid communication for directing fluid in said reservoir from said pump upward through said conduit; and,
a swivel coupling included in said supply line for allowing rotation of said planting column without causing rotation of said supply line between said pump and said swivel coupling;
whereby fluid may be circulated through said planting column to provide nutrients to said planting medium for growing plants inserted into said planting ports and damage to the supply line caused by snagging on said pump or binding up and kinking of the supply line as a result of turning said planting column is prevented.

19. The apparatus of claim 18 wherein said planting column comprises at least a pair of modules each having a hollow module interior, a bottom wall including a plurality of drain holes forming a generally enclosed bottom end, and an open top end; said bottom wall of each said module adapted to engage a top end of an adjacent module for stacking said modules in an end-to-end arrangement to form said planting column.

20. The apparatus of claim 19 wherein each of said modules includes a module conduit carried by said bottom wall forming an opening in said bottom wall and extending from said bottom wall upward through said hollow module interior to said open top end for channeling fluid through said hollow module interior.

21. The apparatus of claim 20 including a conduit receiving slot formed in said bottom wall of each module adjacent said opening in said bottom wall; said conduit receiving slot adapted to engage a top portion of a module conduit from an adjacent lower module in said planting column when said modules are stacked end-to-end to form said conduit and provide a continuous fluid passageway through said planting column.

22. The apparatus of claim 18 wherein said fluid distributor is constructed and arranged to provide a distribution reservoir with a plurality of drain holes formed in a bottom wall of said distributor; said drain holes adapted for distributing said fluid into said hollow interior of said planting column while maintaining a fluid level in said distribution reservoir to provide a consistent continuous flow of fluid into said planting column that is evenly distributed.

23. The apparatus of claim 22 including a distributor conduit carried by said bottom wall of said fluid distributor forming an opening in said bottom wall and extending from said bottom wall upward into said distribution reservoir; a conduit receiving slot formed in said bottom wall of said fluid distributor adjacent said opening in said bottom wall; said conduit receiving slot adapted to engage a top portion of said conduit in said planting column to provide a continuous fluid passageway from said conduit into said fluid distributor.

24. A hydroponic plant cultivating apparatus comprising:
a reservoir for holding fluid;
at least a pair of modules each having a hollow interior defined by an insulated sidewall, a bottom wall including a plurality of drain holes forming a generally enclosed bottom end, and an open top end;
a module conduit included in each said module carried by said bottom wall forming an opening in said bottom wall and extending from said bottom wall upward through said hollow interior to said open top end for channeling fluid through said hollow interior;
said bottom wall of each said module adapted to engage a top end of an adjacent module for stacking said modules in an end-to-end arrangement to form a planting column;
a conduit receiving slot formed in said bottom wall adjacent said opening in said bottom wall; said conduit receiving slot adapted to engage a top portion of a conduit from an adjacent lower module in said planting column when said modules are stacked end-to-end to provide a continuous fluid passageway through said planting column;
a platform carried by said reservoir engaging a bottom portion of said planting column to mount said planting column in a generally vertical orientation atop said reservoir;
a supply line connecting said reservoir in fluid communication to said continuous fluid passageway for directing fluid from said reservoir upward through said planting column; and,
a fluid distributor mounted atop said planting column in fluid communication with said fluid passageway for distributing said fluid into said hollow interior of said planting column.

25. The apparatus of claim 24 wherein said planting column is rotatably carried by said platform atop said reservoir.

26. The apparatus of claim 25 including a swivel coupling included along said supply line for allowing rotation of said planting column without causing rotation of said supply line between said swivel coupling and said reservoir.

27. The apparatus of claim 24 wherein said fluid distributor is constructed and arranged to provide a distribution reservoir with a plurality of drain holes formed in a bottom wall of said distributor; said drain holes adapted for distributing said fluid into said hollow interior of said planting column while maintaining a fluid level in said distribution reservoir to provide a consistent continuous flow of fluid into said planting column that is evenly distributed.

28. The apparatus of claim 27 including a distributor conduit carried by said bottom wall of said fluid distributor forming an opening in said bottom wall and extending from said bottom wall upward into said distribution reservoir; a conduit receiving slot formed in said bottom wall of said fluid distributor adjacent said opening in said bottom wall; said conduit receiving slot adapted to engage a top portion of said module conduit in said planting column to receive fluid into said fluid distributor.

* * * * *